A. D. GILPIN.
DIFFERENTIAL MECHANISM.
APPLICATION FILED SEPT. 30, 1910.
997,617.
Patented July 11, 1911.
2 SHEETS—SHEET 1.
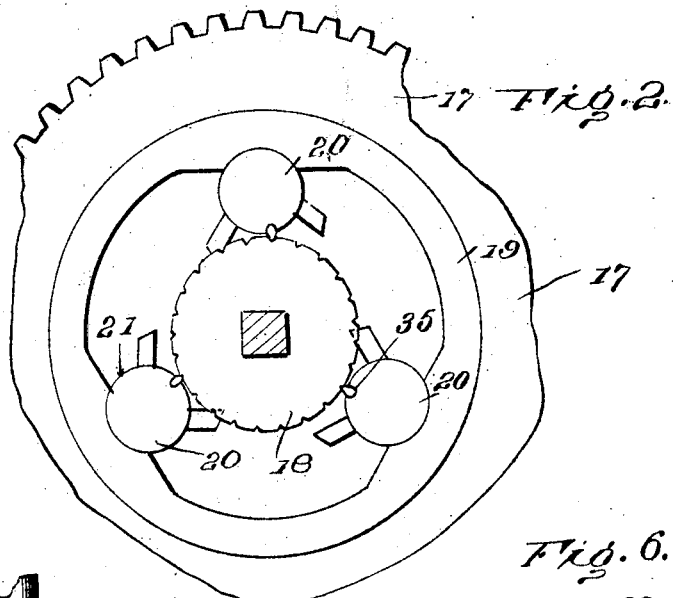
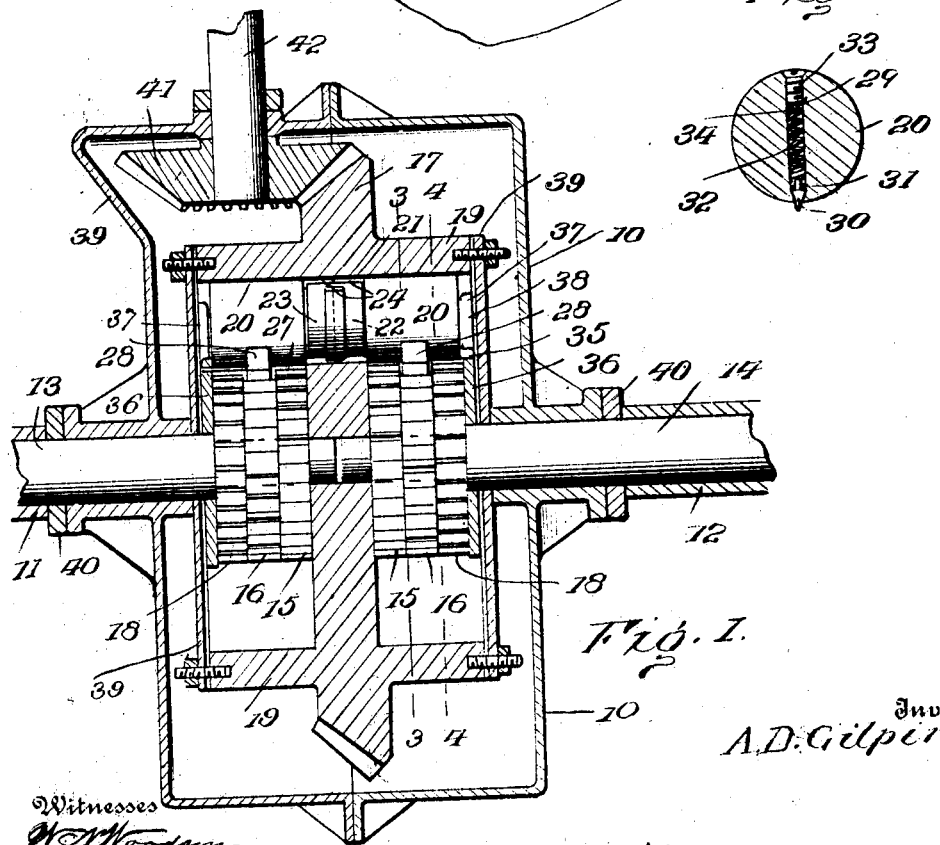
Witnesses
W. N. Woodson
Juana M. Fallin
Inventor
A. D. Gilpin
By
Attorney

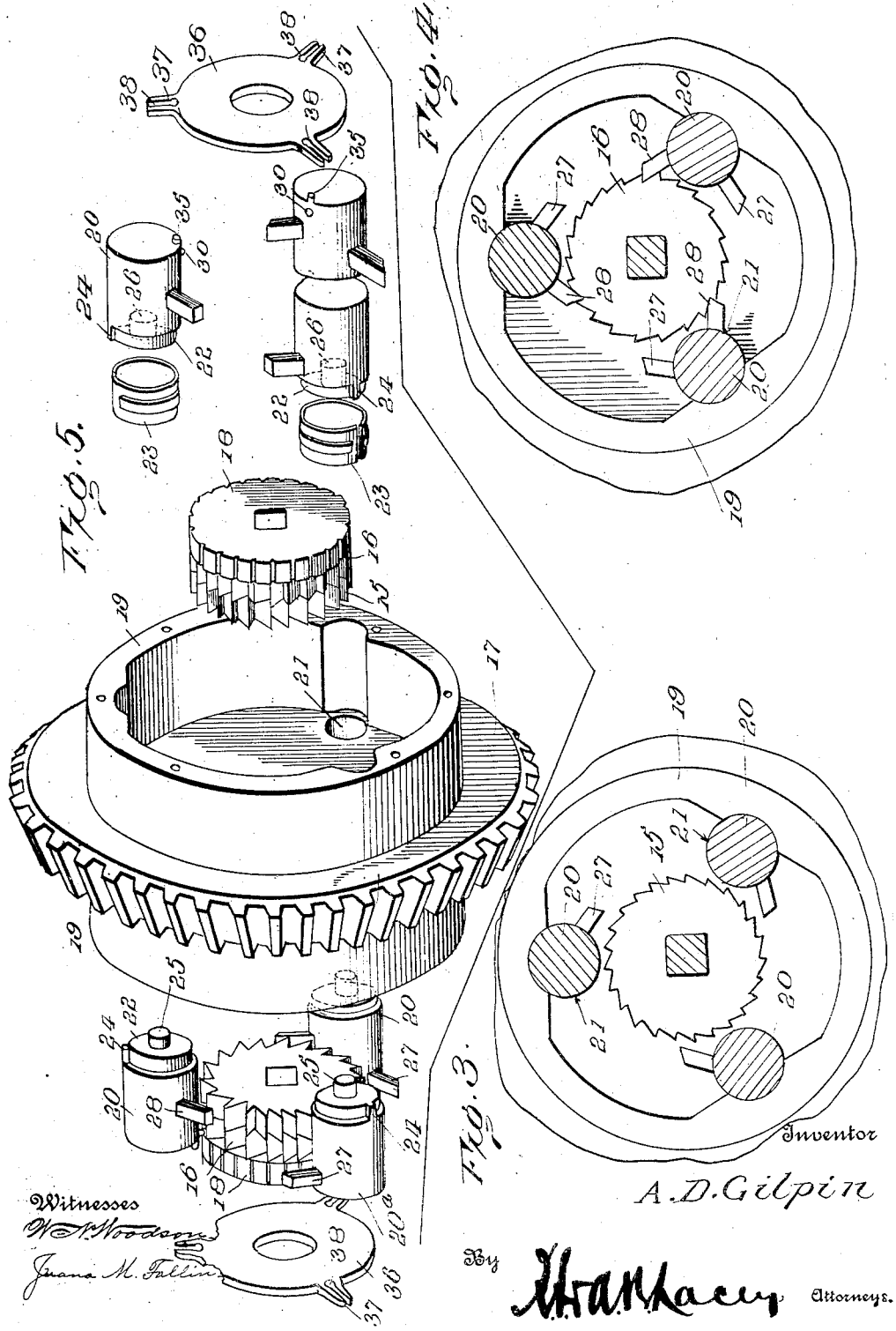

UNITED STATES PATENT OFFICE.

ALBERT D. GILPIN, OF LINCOLN, KANSAS.

DIFFERENTIAL MECHANISM.

997,617.

Specification of Letters Patent. Patented July 11, 1911.

Application filed September 30, 1910. Serial No. 584,769.

*To all whom it may concern:*

Be it known that I, ALBERT D. GILPIN, citizen of the United States, residing at Lincoln, in the county of Lincoln and State of Kansas, have invented certain new and useful Improvements in Differential Mechanism, of which the following is a specification.

This invention relates to motor vehicles and has particular reference to an improvement in that portion of the power transmission known as the differential mechanism.

An object of this invention is to provide a strong and substantial mechanism for transmitting the power to the axle sections so as to positively actuate the same either in a forward or a backward direction, and which at the same time will admit of the racing of the outer axle-section when the motor vehicle is on curves.

The invention has for another object to provide an improved pawl mechanism adapted to intermesh with peculiarly arranged ratchets carried upon the axle-sections to admit of the required movements of the same.

The invention further contemplates a substantial differential mechanism which is compact in form so as to occupy but a small space to accommodate the device to machines now manufactured.

For a full understanding of the invention reference is to be had to the following description and accompanying drawings, in which:—

Figure 1 is a transverse section through the improved differential mechanism. Fig. 2 is a side elevation of the improved mechanism having one of the disks removed therefrom. Fig. 3 is a section on the line 3—3 of Fig. 1. Fig. 4 is a section on the line 4—4 of Fig. 1. Fig. 5 is a perspective view disclosing the improved mechanism having the parts detached one from the other. Fig. 6 is a transverse section through one of the locking pins disclosing the tooth and the mounting therefor.

Corresponding and like parts are referred to in the following description and indicated in all the views of the accompanying drawings by the same reference characters.

Referring to the drawings the numeral 10 designates a suitable housing for the reception of the improved differential mechanism. Axle-sleeves 11 and 12 extend oppositely from the housing 10 and support therein the axle-sections 13 and 14. Each of the axle-sections 13 and 14 is formed angular in cross-section at its inner end and provided with a pair of ratchet wheels 15 and 16 which are correspondingly apertured to receive the angular portion of the axle-section having their teeth extending in opposite directions.

A drive or main gear-wheel 17 is disposed between the inner adjacent ends of the axle-sections 13 and 14, the gear 17 being centrally apertured for the reception of the inner extremities of the axle-sections. The axle-sections 13 and 14 are further provided with gear-wheels 18 upon their inner ends disposed against the outer sides of the ratchets 16.

The gear-wheel 17 carries drums 19 against its opposite sides engaging about the inner ends of the axle-sections 13 and 14. The drums 19 are recessed at their inner faces to receive transverse rocking-pins 20 of cylindrical form which project into suitable openings 21 provided in the gear 17. The rocking pins 20 are arranged in pairs in the opposite sides of the gear 17 and have their inner meeting ends reduced as at 22 to receive a split circular spring 23. The pins 20 carry stops 24 at their inner ends extending outwardly from one side of each of the reduced portions 22 to receive the opposite ends of the circular springs 23. One of the rocking-pins 20ª is preferably provided with a projection 25 engaging into a correspondingly formed recess 26 in the inner end of the opposite rocking-pin 20. Each of the rocking-pins is provided with a pair of radially extending pawls 27 and 28, the same being disposed in offset relation relative to one another for alternate engagement with the teeth of the ratchets 15 and 16. The outer ends of the rocking-pins 20 are diametrically recessed as at 29 to receive a conical tooth 30 seating in the lower side of the rocking pin 20 and projecting from the same. The inner end of the tooth is reduced to provide a shank 31 for the reception of the lower end of an expansion spring 32. The upper end of the spring 32 seats against a screw-plug 33, engaging detachably in the opposite side of the rocking-pin, and being provided with a depending shank 34 for insertion into the spring 32 to center the same. Each of the rocking-pins 20 is provided with an eccentric stud 35 projecting from its outer end for a purpose hereafter set forth.

Each of the axle-sections 13 and 14 is provided with a web 36 having radial arms 37 provided with longitudinal recesses 38 terminating in their outer ends. The web 36 engages about the sections 13 and 14 and against the gear-wheels 18, the arms 37 extending outwardly and engaging about the studs or wrist-pins 35. The web 36 is employed for the purpose of insuring the uniform rocking movement of the pins 20 during the operation of the device. The tooth 30 engages with the teeth of the gear-wheel 18 to impart rotation to the rocking pin 20 when the axle-section 13 moves.

In the manufacture of the improved transmission mechanism it is found preferable to rivet or otherwise secure the ratchets 16 and 17 and the gears 18 to one another so as to produce a uniform device.

Disks 39 are engaged against the outer edges of the drums 19 to close the same so as to prevent the access of dust and the like to the ratchets and gears and to prevent the flowing of oil from the differential mechanism. The axle-sections 13 and 14 are provided with collars 40 engaging against the outer faces of the disks 39 to further prevent the access of dust to the mechanism.

In the operation of the improved differential mechanism, when the gear wheel 17 is rotated in a forward direction it carries therewith the rocking pins 20. The studs 35 eccentrically carried upon the ends of the rocking pins engage against the inner walls of the slots 38 in the radial arms 37. As the arms 37 are carried upon the webs 36, and since the webs are rigid upon the shaft sections 13 and 14, the pins 20 are caused to revolve and to deflect the forward pawls 27 into engagement with the ratchets 15. The radial arms 37 are so spaced apart as to register with the studs of each of the rocking pins 20 so as to move the same in unison and cause the three pawls 27 to intermesh with the ratchets 15 at the same time. This movement therefore locks the axle-sections 13 and 14 to the gear wheel 17. When one of the axle-sections 13 and 14 moves faster than the other, as in rounding a curve or the like, the ratchet-wheel 15 rides loosely beneath the pawls 27, the rocking pin 20 supporting the pawls, rotating slightly against the tension of the springs 23. When the gear-wheel 17 is reversed in movement so as to turn backwardly, the rocking pins 20 are carried therewith and the studs 35 engage against the opposite walls of the slots 38 and are caused to revolve the pins 20 in an opposite direction. The opposite movement of the rocking pins brings the pawls 28 into engagement with the teeth of the ratchets 16. The axle-sections 13 and 14 are thereby locked upon the gear wheel 17.

The drawings disclose the gear 17 as being of the well-known type, namely, a beveled gearing meshing with a corresponding gear 41 carried upon the drive-shaft 42. When one of the rocking-pins revolves, the remaining rocking-pins, disclosed in the present instance as being three in number, revolve through the same distance and at the same time as the studs 35 engage with the arms 37 and are not permitted to move independently of one another.

Having thus described the invention what is claimed as new is:—

1. A differential mechanism including a main gear wheel having drums upon its opposite sides, axle-sections extending into the drums, pairs of oppositely formed ratchets carried rigidly upon the inner ends of the axle-sections within the drums, rocking pins disposed within the drums and having offset pawls for alternate engagement with the ratchets, gears carried upon the inner ends of the axle-sections, and yielding teeth carried in the outer ends of said rocking pins for engagement with said gears.

2. A differential mechanism including a main gear having oppositely extending drums, axle-sections extending into the opposite ends of the drums, oppositely formed ratchet wheels carried rigidly upon the inner ends of the axle-sections, rocking pins carried in the drums and having offset pawls for alternate engagement with the teeth of the ratchets, and springs connecting each pair of said rocking pins to yieldingly connect the same.

3. A differential mechanism including a main gear, axle-sections terminating against the opposite sides of the gear, oppositely formed ratchets disposed upon the inner ends of the axle-sections, drums carried by said main gear, pairs of rocking pins carried in registration in the drums, and springs connecting the registering rocking pins.

4. A differential mechanism including a main gear, drums carried against the opposite sides of the main gear, rocking pins journaled in the drums, axle-sections projecting into the drums, gears carried upon the inner ends of the axle sections registering with the rocking pins, oppositely formed ratchets carried upon the axle-sections inwardly of the gears, pawls mounted upon the rocking pins registering with the ratchets, a yieldable connection disposed between the registering rocking pins in the opposite drums, and teeth carried by said rocking pins for yieldable engagement with the teeth of said gears.

5. A differential mechanism including a main gear having oppositely extending drums, axle-sections projecting into the drums, ratchets carried upon the inner ends of the axle-sections, gear-wheels disposed upon the inner ends of the axle-sections, rocking pins journaled in the drums registering with the gear wheels, and a yielding connection disposed between the registering rocking pins in the opposed drums.

6. A differential mechanism including a main gear, drums formed upon the sides of the main gear and having recesses formed in their inner walls, rocking pins seating in the recesses and having offset pawls, axle-sections projecting into the drums, oppositely formed ratchets carried upon the axle-sections for engagement with the pawls, and rocking pins supporting the pawls for alternately bringing the same into engagement with the ratchets.

7. A differential mechanism including a main gear having drums against its opposite sides, axle-sections projecting into the drums, oppositely formed ratchet wheels carried upon the inner ends of the axle-sections, rocking pins rotatably carried in the drum in registration with the ratchet-wheels, oppositely extending pawls carried upon the rocking pins for alternate engagement with the oppositely formed ratchet wheels, webs keyed to the axle-sections and having radial arms, eccentric studs carried upon the rocking pins and engaging with the arms of the webs, and springs connecting the inner registering ends of the rocking pins.

8. A differential mechanism including a gear having drums formed against its opposite sides, axle-sections projecting into the drums, ratchet wheels carried upon the axle-sections, rocking pins journaled in the drums and having inwardly extending pawls engaging with the ratchet wheels, webs carried by the axle-sections and having radial arms registering with the rocking pins provided with radial slots, eccentric pins disposed upon the outer ends of the rocking pins and engaging in the slots, and connecting means arranged between the registering rocking pins to yieldingly hold the rocking pins in the same position.

In testimony whereof, I affix my signature in presence of two witnesses.

ALBERT D. GILPIN. [L. S.]

Witnesses:
B. F. SPENCER,
JAMES C. COOPER.